United States Patent [19]

Takenaka et al.

[11] Patent Number: 5,708,631
[45] Date of Patent: Jan. 13, 1998

[54] SYSTEM FOR FAST REPRODUCING OF INFORMATION RECORDED ON AN OPTICAL DISC

[75] Inventors: Yosihiko Takenaka; Yasumitsu Hitomi, both of Saitama, Japan

[73] Assignee: Pioneer Electronic Corporation, Tokyo, Japan

[21] Appl. No.: 571,765

[22] Filed: Dec. 13, 1995

[30] Foreign Application Priority Data

Dec. 22, 1994 [JP] Japan ................. 6-320500

[51] Int. Cl.[6] ............. G11B 17/00; G11B 27/19
[52] U.S. Cl. ............. 369/32; 369/33; 360/72.2
[58] Field of Search ............. 369/32, 33, 49, 369/604, 83; 360/74.1, 74.4, 72.2, 78.14, 13; 386/55

[56] References Cited

U.S. PATENT DOCUMENTS

| 4,931,879 | 6/1990 | Koga | 386/111 |
| 5,267,334 | 11/1993 | Normille | 382/236 |
| 5,477,516 | 12/1995 | Takezawa | 369/48 |

*Primary Examiner*—Aristotelis M. Psitos
*Assistant Examiner*—Alan Faber
*Attorney, Agent, or Firm*—Nikaido, Marmelstein, Murray & Oram LLP

[57] ABSTRACT

An optical disc has a storage storing addresses of information parts for forwardly reproducing, and the information parts are divided at every information unit. A first table and a second table are provided. The first table stores an address of a last information part of each information unit, and the second table stores an address of an information part to be reversely reproduced next. Reverse reproduction of information parts is performed by retrieving the data stored in the first and second tables.

2 Claims, 10 Drawing Sheets

PRIOR ART

| BYTE POSITION NUMBER (BPN) | byte 1 | byte 2 | byte 3 | byte 4 | |
|---|---|---|---|---|---|
| 12 | P-TN04 | 1 | 3 | ② | P-TN0 AREA |
| 13 | ④ | 6 | 0 | P-TN06 | |

| POINTER NUMBER (PN) | | byte 1 | byte 2 | byte 3 | byte 4 | |
|---|---|---|---|---|---|---|
| 1 | 76 | | START ADDRESS | | | START/END AREA |
| | 77 | | END ADDRESS | | 0 | LINK-P AREA |
| 2 | 78 | | | | | |
| | 79 | | END ADDRESS | | ⑤ | |
| 3 | 80 | | | | | |
| | 81 | | | | 0 | |
| 4 | 82 | | | | | |
| | 83 | | END ADDRESS | | ⑦ | |
| 5 | 84 | | | | | |
| | 85 | | END ADDRESS | | ⑨ | |
| 6 | 86 | | | | | |
| | 87 | | | | 0 | |
| 7 | 88 | | | | | |
| | 89 | | END ADDRESS | | ⓪ | |
| 8 | 90 | | | | | |
| | 91 | | | | | |
| 9 | 92 | | | | | |
| | 93 | | END ADDRESS | | ⓪ | |

SYSTEM FOR FAST REPRODUCING OF INFORMATION RECORDED ON AN OPTICAL DISC

BACKGROUND OF THE INVENTION

The present invention relates to an information reproducing system for a magneto-optical recordable disc such as a Minidisc, and more particularly to a system in a reverse reproduction.

The Minidisc (MD) which is smaller than the CD (the diameter is 6.4 cm), and has the same reproducing time as the CD for 74 minutes by using data compression technique has become popular.

(DRAM)

Furthermore, in the MD, a shock proof memory (DRAM) is provided for preventing an audio signal from interrupting caused by a jump of a pickup.

The use of the DRAM is advantageous in preventing skipping of sounds which occur when the pickup jumps by a shock. More particularly, the pickup reads compressed digital data recorded on the MD at the speed of 1.4 Mbit/sec and the read-out data are written in a memory such as a DRAM. The data is retrieved from the memory at the speed of 0.3 Mbit/sec and the compression is released to be expanded so that the analog signal is produced. Supposing that the capacity of the DRAM is one Mbit, while the MD is played, the DRAM becomes full in 0.9 second. When a jump of the pickup occurs, it becomes impossible for the pickup to read the data. Since the data stored in the DRAM can be fed for another three seconds, if the pickup quickly returns to the original position within three seconds and resumes the reading, there is no interruption in the audio signal fed to the loudspeaker.

(DISC)

One type of the MDs is only for reproduction and are manufactured in the same manner as the CD. Another type of MD is a recordable MD made of magneto-optical disc, capable of over-writing.

The feature of the MD is its full function of random accessibility. For example, when polycarbonate is injection molded to form a substrate of the MD, a pregroove is also formed along the entire track of the disc so that a track-following servo system and spindle servo system are utilized at recording and at reproduction. Addresses are recorded along the entire track of the MD so that a stable and quick random access is possible even in the case of unrecorded disc. Furthermore, a pregroove wobbled with the frequency is formed on the disc representing address data of absolute time (ADIP: Address in Pre-groove).

STRUCTURE FOR A CARTRIDGE AND A SYSTEM FOR RECORDING AND REPRODUCING INFORMATION)

Figure 5:
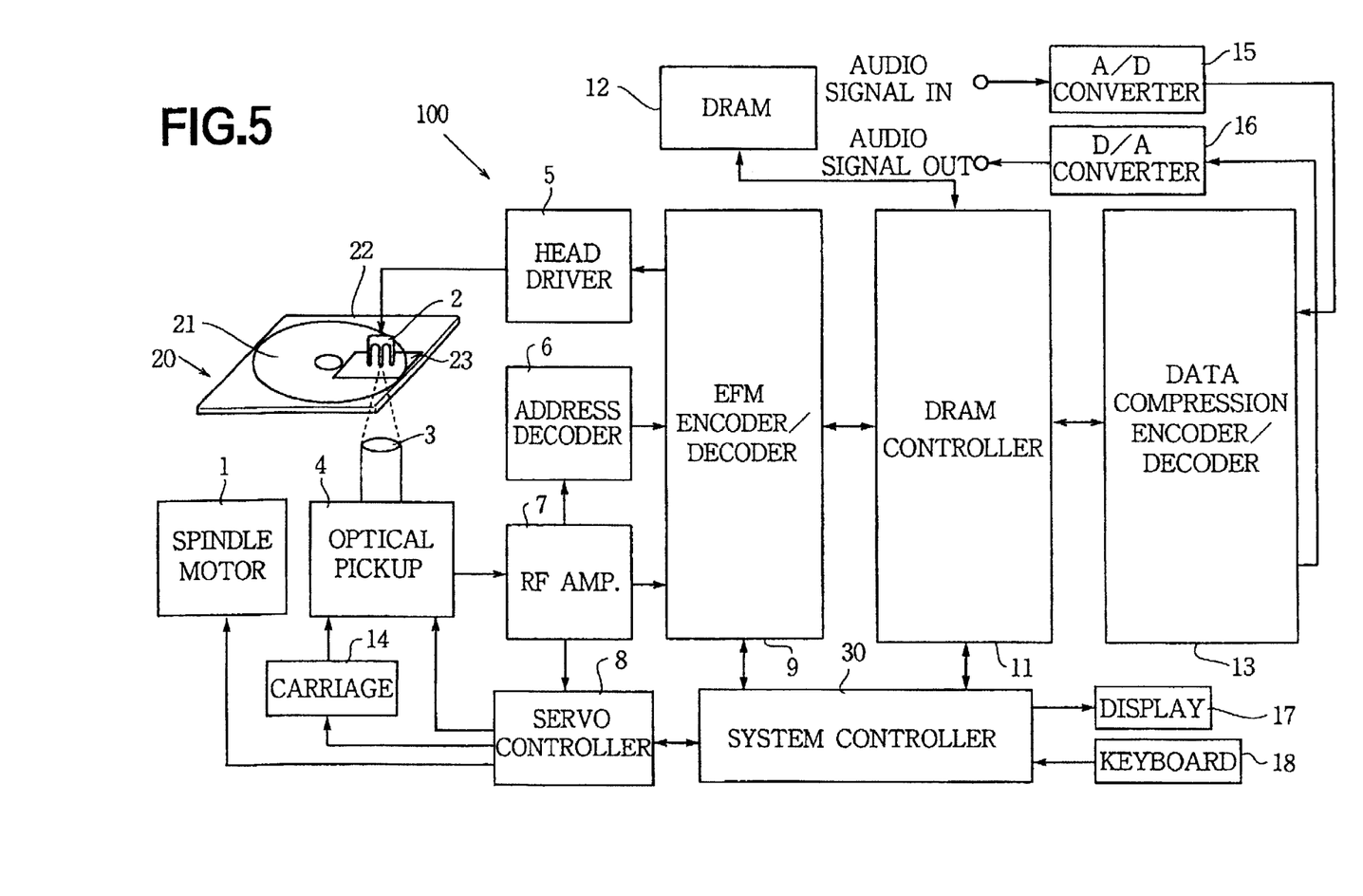
FIG. 5 is a block diagram showing a recording and reproducing system of the MD.

FIG. 5 shows a system for recording and reproducing an MD.

An MD 20 has a cartridge 22, and a magneto-optical disc 21 rotatably mounted in the cartridge for recording and reproducing data with a digital signal by a recording and reproducing system 100. The cartridge 22 has a shutter 23 having an access window (not shown) on either side thereof.

The system 100 comprises a magnetic head 2, a head driver 5 for driving the magnetic head, a pickup 4 mounted on a carriage 14 for moving the pickup 4 in the radial direction of the disc 21, a servo controller 8 for controlling the pickup 4 and the carriage 14, and a spindle motor 1 for rotating the disc 21 in accordance with a signal from the servo controller 8. The pickup 4 has an optical system such as an objective 3.

When the MD 20 is loaded on a recording or reproducing position of the system 100, the shutter 23 is opened by a shutter operating device (not shown) and the magnetic head 2 and objective 3 of the pickup 4 are moved to the disc 21 for recording or reproducing the data.

(REPRODUCTION)

When reproducing the disc 21, the disc is rotated by the spindle motor 1 at a predetermined speed. A laser beam emitted from the pickup 4 is focused on the disc through the objective 3 to irradiate a magnetic film of the disc 21. The reflected beam, a plane of polarization of which is slightly rotated by the Kerr effect, is received by the pickup 4 for reading out the data on the disc. The pickup 4 produces an RF signal which is fed to an RF amplifier 7. In the RF amplifier 7, the RF signal is amplified to a predetermined level. An amplified RF signal is fed to an address decoder 6 which derives a wobbling frequency therefrom so as to detect a time position on the disc 21 even when data are not recorded.

The signal from the RF amplifier 7 is applied to an EFM encoder/decoder 9 where an EFM signal is derived from the RF signal. The EFM signal is stored in a DRAM 12 which is controlled by a DRAM controller 11. The stored data is fed to a data compression encoder/decoder 13 to be decoded in order. The decoded data is converted into an analog signal by an D/A converter 16 to be output.

(RECORDING)

When recording the data on the disc, the system 100 further has an A/D converter 15 wherein information to be recorded on the magneto-optical disc 21, which is in the form of an analog signal, is converted into a digital data signal. The data signal is fed to the data compression encoder/decoder 13 where the data is compressed to ⅕ in accordance with the threshold of hearing of an ear of a human being and the masking effect. The digital signal is fed to the EFM encoder/decoder 9 which applies an encoded data to the head driver 5. The head driver 5 accordingly drives the magnetic head 2.

The magnetic film of the disc 21 is heated by the temperature in excess of the Curie temperature for modulating the magnetic field. Thus, the information is written on the disc.

The servo controller 8 and the EFM encoder/decoder 9 are controlled by a system controller 30 which is connected to a keyboard 18 for manually controlling the controller 30, and to a display 17 for indicating reproducing conditions.

(EDITING)

The MD has various editing functions which will be described with reference to FIGS. 6a, 6b, 6c and 6d.

Figure 6:
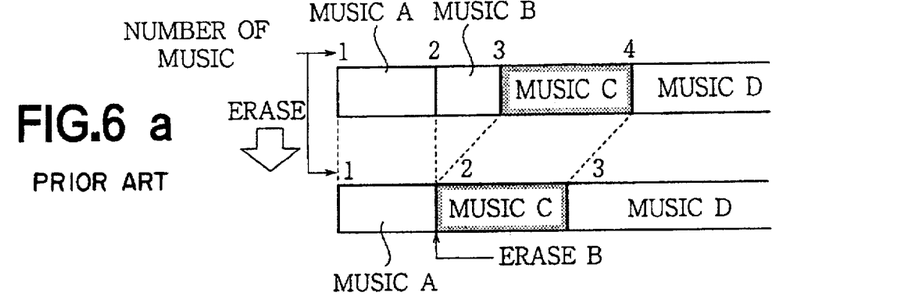
FIGS. 6a, 6b, 6c and 6d are explanatory diagrams showing editing operations of the recorded data on the MD.

FIG. 6a shows an erasing function for erasing an optional music. In FIG. 6a, a music B recorded between a music A and a music C is erased. It is also possible to erase a part of the music.

FIG. 6b shows a dividing function to divide a music into a plurality of parts. The music B is divided into parts B1 and B2.

FIG. 6c shows a combining function to combine a plurality of musics to one music. The music B is combined with the music C.

FIG. 6d shows a moving function where the music C is moved to the first position. In the function, it is also possible to exchange, for example, a third music and a seventh music with each other.

Figure 7:
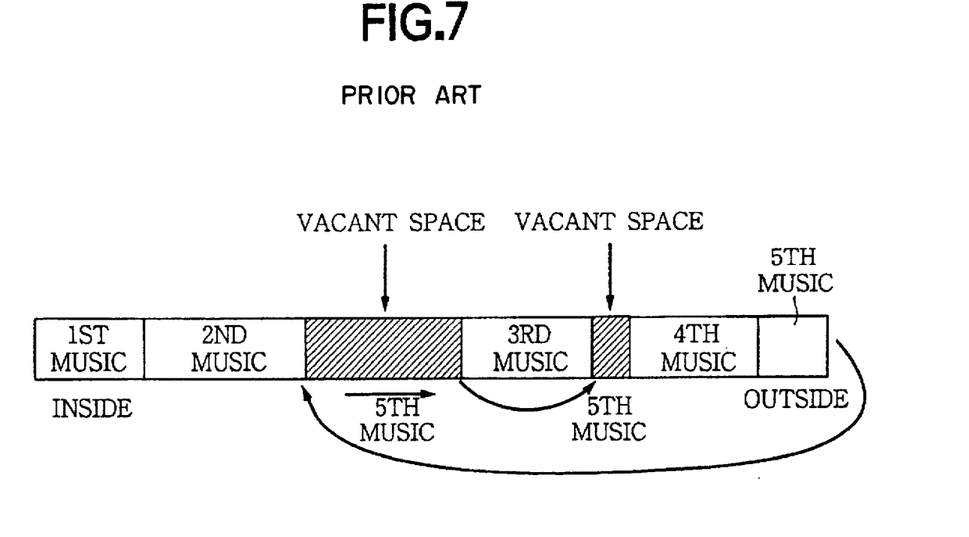
FIG. 7 is an explanatory diagram showing one of the editing operations of the MD.

FIG. 7 shows a recordable MD on which a several musics are recorded. If a fifth music is recorded on an end area of the MD, and the fifth music has a larger content than the end area, a residual part of the music is recorded on a vacant space formed between a second music and a third music and another vacant space between the third music and a fourth music in order. Consequently, the fifth music is divided into parts to be separately recorded on the MD.

In such a case, when the music which is separately recorded is reproduced, it is possible to reproduce the music without skipping of the sound by using the DRAM. The data stored in the DRAM is read out and reproduced, while the pickup searches and retrieves data of a part next to the part reproduced at present, and the data is stored in the DRAM in order.

(TOC)

The disc 21 has a TOC (table of contents) in an initial portion of the recording area for providing the editing functions. In the TOC, a U-TOC area sector is provided for storing pointers for representing start and end positions of each part of information, thereby controlling addresses of the recorded information.

(DATA STRUCTURE)

Figure 8:
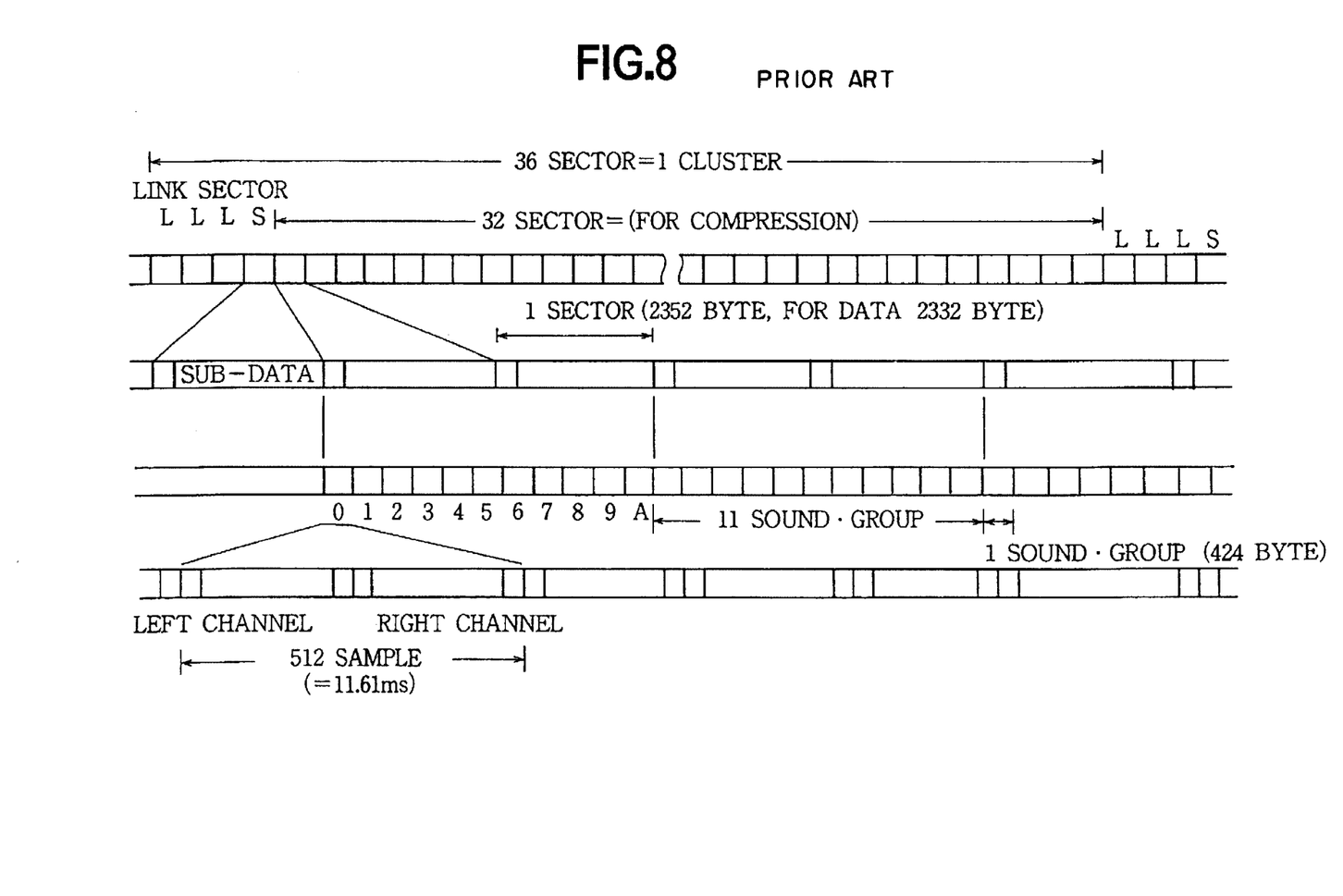
FIG. 8 is a diagram showing a sector for data on the MD.

FIG. 8 shows a data structure of the MD.

The MD has a cluster which is a recording unit of the data which is written on the MD. The MD is rewritten at a multiple of one cluster. The data to be recorded is once stored in the DRAM and written on the disc based on the stored data.

One cluster comprises 36 sectors, and one sector has 588×4 bytes, namely 2352 bytes. A sound group comprises two sectors which are divided into 11 parts.

Namely, an address of an optional part of the MD represents a position of a cluster from a header of the recording area and a position of a sector in the cluster.

(U-TOC)

Figure 9:
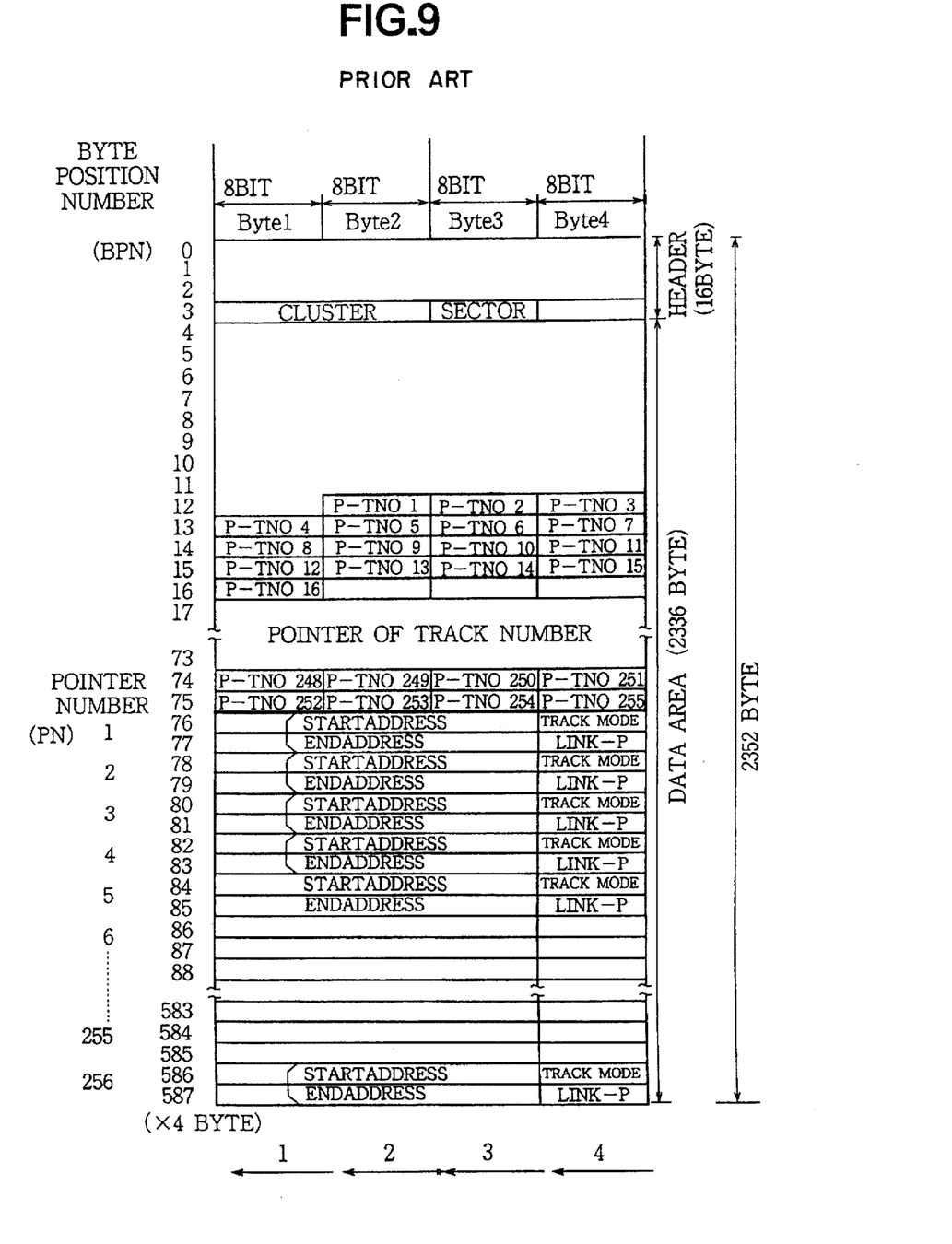
FIG. 9 is a diagram showing a TOC of the MD.

FIG. 9 shows the U-TOC area sector comprising 1 sector. The sector has an array of bytes which are numbered by byte position numbers of BPN 0 to BPN 587. Each line of the array comprises for bytes. The area between BPN 0 and BPN 3 is the header which represents that the sector is the U-TOC area sector and is the head of the sector. It also represents the address of the sector in the cluster and the number of the cluster.

The area between BPN 4 and BPN 587 is a data area in which pointers are stored.

The area between the second byte of BPN 12 and the fourth byte of BPN 75 represents the pointer of the track number (music number) P-TNO in which pointer numbers PN, each representing an address of a head of an information part of each music, are recorded. The P-TNOn is a pointer of a start address of the track number n. The value of the P-TNOn is indicated by an offset position of the start address thereof.

The pointer will be described, in the latter part of the BPN for convenience' sake of description.

In the area between BPN 76 and BPN 587, a pair of sequential byte position numbers of the odd number and the even number have one pointer number PN representing an address of a start position of an information part and an end position thereof. For example, BPN 76 and BPN 77 is numbered PN 0, BPN 78 and BPN 79 is numbered PN 1, . . . and BPN 586 and BPN 587 is PN 255.

The pointer number PN is obtained as follows.
even number of BPN: PN=(BPN - 76) / 2
odd number of BPN: PN=(BPN - 77) / 2

In the even numbers (76, 78, 80 . . . 586) of the BPN, the bytes 1 to 3 represent the start address, and the byte 4 represents a track mode for defining the information part. In the odd numbers (77, 79, 81 . . . 587) of the BPN, the bytes 1 to 3 represent the end address, and the byte 4 represents a linking pointer Link-P for an address of the information part next to the information part.

Each of the start address and the end address comprises a cluster number of 14 bits, sector number of 6 bits, and sound group number of 4 bits.

As aforementioned, the PN and the BPN are used for convenience' sake of description. Therefore, in normally each byte of the sector has the BPN from the beginning thereof. Since the byte position number BPN is numbered to every four bytes, the BPN is represented as follows.

Position of Link-P+(76×4+(P-TNOn)×8)+8

The value of the Link-P is indicated by an offset position of the next part of the same track.

Thus, the editing of the music is performed by rewriting the content of the TOC.

When recording the information, the TOC of the MD 20 is stored in an area having an extra capacity of the DRAM 12, which is not used as the shock proof memory or another DRAM provided by the system controller 10 shown in FIG. 5. When the information is recorded on the MD 20, the TOC (U-TOC) of the MD 20 is rewritten.

(MAKING THE POINTER TABLE)

The pointer is made as follows for rewriting and editing the information.

Figure 10:
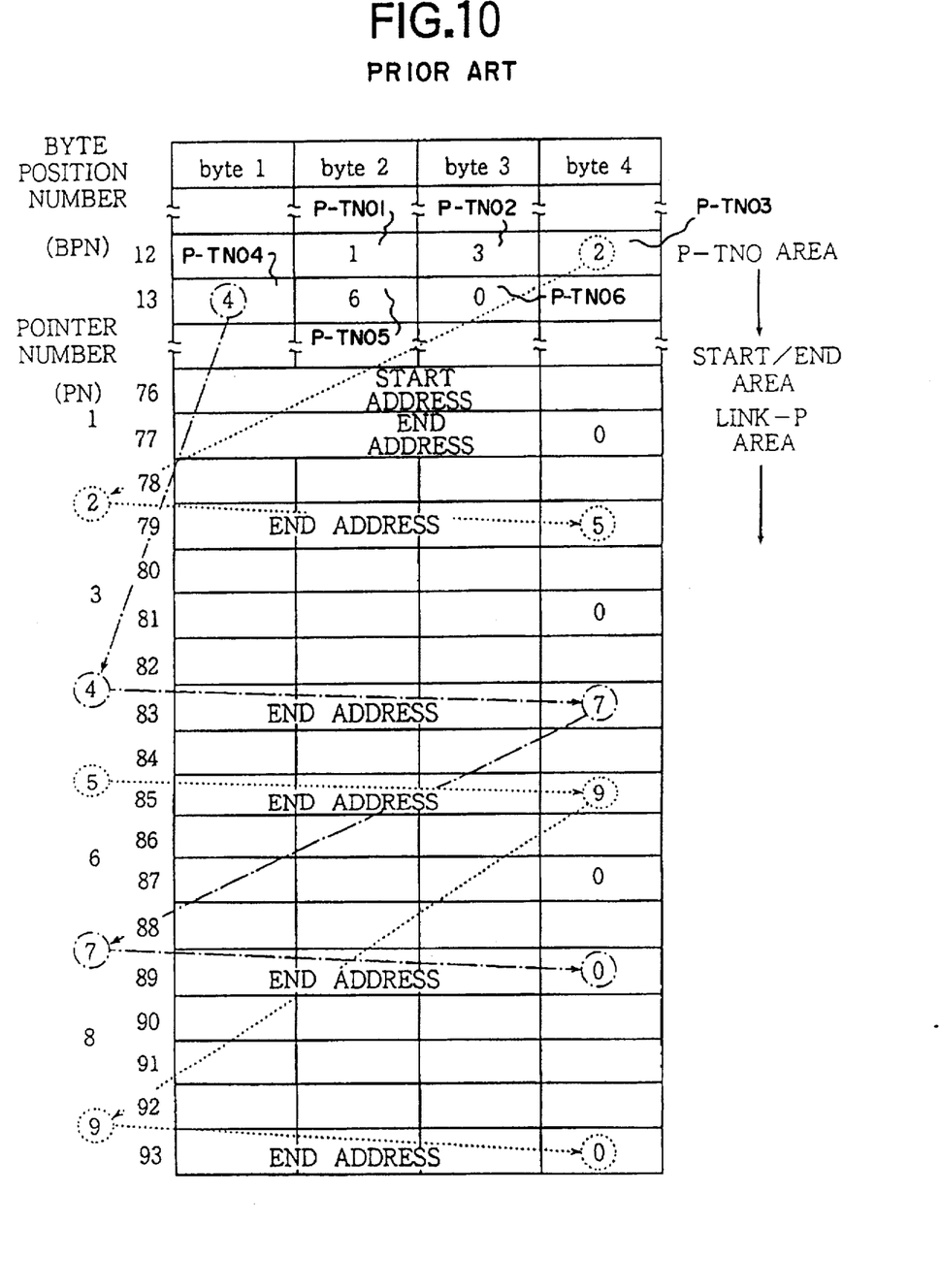
FIG. 10 is a diagram showing a conventional reproducing process of the MD.

FIG. 10 shows a U-TOC area sector stored in the DRAM 12.

(1) Erasing

In the case that the third music is erased, the pointer number PN "2" of the P-TNO 3 in the P-TNO area, which corresponds to the third music is rewritten to "0".

(2) Division

In the case that the fifth music is divided into two parts, the PN of the P-TNO 5 is "6". An address immediately before the division is written to the end address of the PN 6. The PN 0 of the Link-P is rewritten to "8". An address next to the end address of the PN 6 is written to the start address of the PN 8. The end address of the PN 6 is written to the end address of the PN 8. The Link-P of the PN 8 is written to "0".

(3) Combining

If the fourth music is combined with the fifth music, the PN of the fifth music is read out first. The PN of the P-TNO 5 of the fifth music is "6". Then, the PN of the P-TNO 4 of the fourth music is read out as "4". The Link-P of the PN 4 is "7". The Link-P "0" of the PN 7 is rewritten to "6". Thereafter, the PN 6 of the P-TNO 5 is rewritten to "0".

(4) Moving

If the first music is exchanged into the third music, the PN 1 of the P-TNO 1 is rewritten to "2" and the PN 2 of the P-TNO 3 is rewritten to "1".

(REPRODUCTION)

The forward reproduction will be described.

When a part of the music is reproduced, the PN of the Link-P of the reproduced part which represents a start address of a part next to the reproduced part is read out. Thus, the next part is searched and reproduced.

If the next part does not exist, the PN of the Link-P is "0". In this case, a first part of the next music is searched and reproduced.

The reproduction including fast forward reproduction will be described with reference to FIG. 10.

When the third music is reproduced, the PN of the P-TNO 3 for the start address is read out from the P-TNO area of the TOC as "2". The PN 2 is retrieved by the system controller 10 and a start address of the part corresponding to the PN 2 is read out to be searched and reproduced.

For the next part of the third music, the Link-P of the PN 2 is read out as "5". Thus, a start address of the part corresponding to the PN 5 is searched and reproduced.

Thereafter, the Link-P of the PN 5 is read out as "9". Thus, a start address of the part corresponding to the PN 9 is read out to be searched and reproduced. Then, the Link-P of the PN 9 is read out as "0". It is determined that the next part does not exist. Thus, the first part of the fourth music (TNO=3+1=4 is read out.

The PN of the P-TNO 4 for the start address is read out as "4". A start address of the part corresponding to the PN 4 is read out to be searched and reproduced.

Then, the Link-P of the PN 4 is read out as "7". Thus, a start address of the part corresponding to the PN 7 is read out to be searched and reproduced.

Thereafter, the Link-P of the PN 7 is read out as "0". Thus, it is determined that the next part does not exist.

A first part of the fifth music (TNO=4+1=5) is read out in the same manner.

When the last part of the music is reproduced, the finish of the reproduction is processed.

(REVERSE REPRODUCTION)

In the fast reverse reproduction, a part prior to the part reproduced is reversely reproduced in order.

When the last part of the third music is reproduced and the music is reversely reproduced, the PN of the last part of the third music is "9" as aforementioned. The PN of the part prior to the part corresponding to the PN 9 is "5".

However, in the system, the first part of the third music is read out. The P-TNO 3 is the PN 2 which is different from the PN 9. Then, the next part is read out from the Link-P of the PN 2 as the PN 5, which is still different from the PN 9. The further next part is read out form the Link-P of the PN 5 as the PN 9 which coincided with the last part. Thus, it is determined that the prior part is PN 5.

An end address of the part corresponding to the PN 5 is read out to be searched and reproduced.

The part prior to the part corresponding to the PN 5 is the PN 2. Thus, an end address of the part corresponding to the PN 2 is read out to be searched and reproduced.

At the next, since the reproduced part and the first part are the PN 2, it is determined that the prior part does not exist. Namely, the first part of the third music is recognized as the PN 2.

Thus, the last part of the second music (TNO=3-1=2) is read out. The P-TNO 2 is the PN 3. The Link-P of the PN 3 is "0" so that the second music is formed by the sole part. The end address is read out to be searched and reproduced.

The reverse reproduction to the first music is performed in the same manner.

From the foregoing, in the forward reproduction, the address of the part to be reproduced is read out by the pointer PN and the address of the following part is read out by the linking pointer Link-P in order.

On the other hand, in the reverse reproduction, the address of the prior part is read out by the table used in the forward reproduction in order. Since the number of retrievals of the PN is 255 at maximum, it takes time for searching, which causes the sound to be skipped and the process of the software to be complicated.

SUMMARY OF THE INVENTION

An object of the present invention is to provide an information reproducing system where the search time in the reverse reproduction is shortened so as to prevent the sound from skipping and the process of the software is simplified.

According to the present invention, there is provided an information reproducing system for an optical disc having a storage storing addresses of information parts, the information parts being divided at every information unit, tables storing data for reversely reproducing the information parts based on the addresses, reproducing means for reproducing the information parts in the reverse direction by retrieving the data stored in the table. The tables comprise a first table and a second table, the first table stores an address of a last information part of each information unit, the second table stores an address of an information part to be reversely reproduced next.

The other objects and features of this invention will become understood from the following description with reference to the accompanying drawings.

DETAILED DESCRIPTION OF THE PREFERRED EMBODIMENTS

Figure 1:
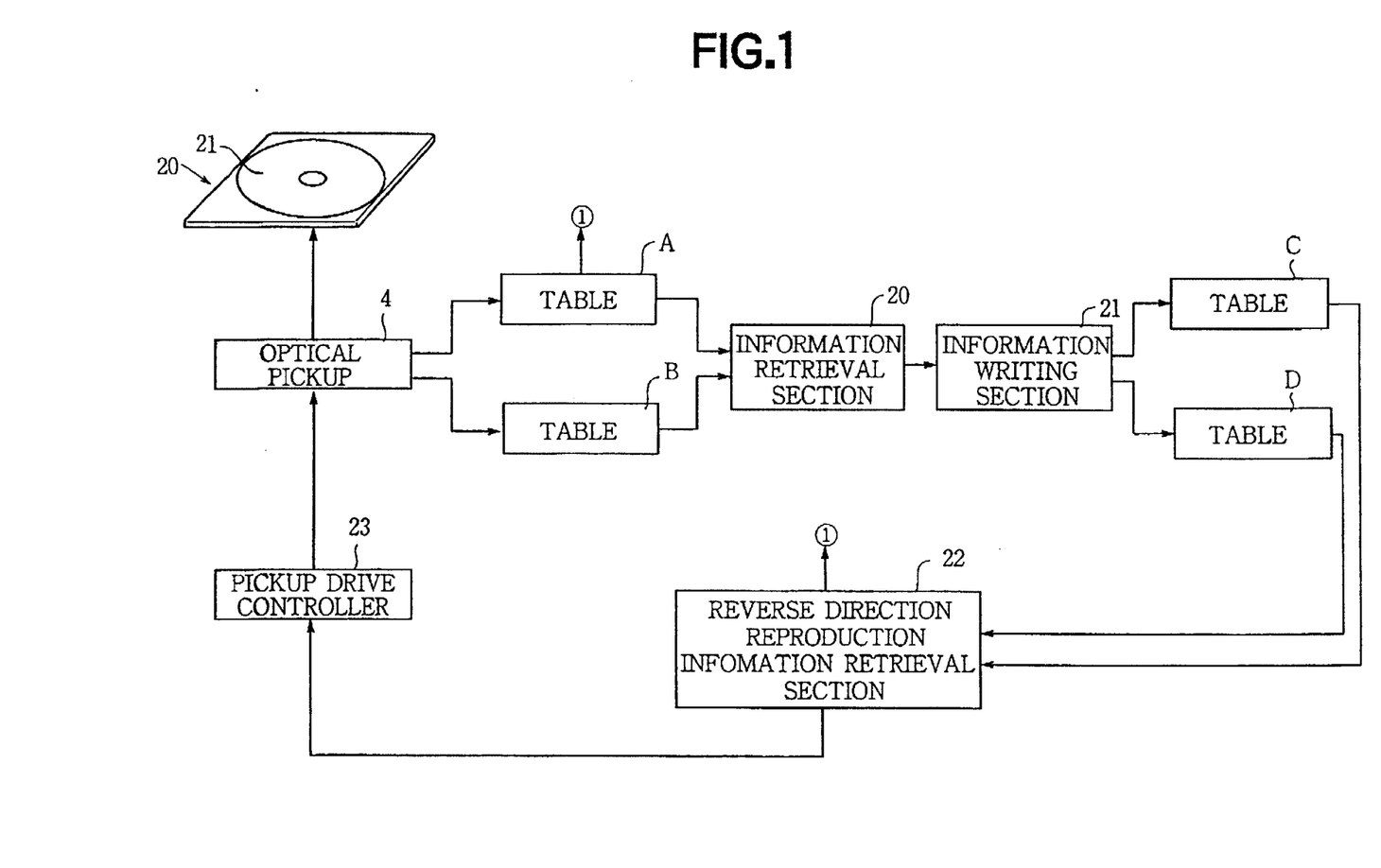
FIG. 1 is a a schematic block diagram showing a reproducing system for an MD according to the present invention.

Referring to FIG. 1 showing a system of the present invention, other structures are the same as the system of FIG. 5 and the descriptions thereof are omitted.

When the information in the TOC corresponding to FIG. 9 is read out from the TOC area on the disc 21 by the pickup 4, the read out TOC information is stored in tables A, B, C and D formed in a vacant area of the DRAM 12 as described hereinafter. The data in tables A and B are provided for the forwarded reproduction, and data in the tables C and D are for the reverse reproduction.

An information retrieval section 20 retrieves each data from the tables A and B. An information writing section 21 operates to write the retrieved data in the tables C and D, respectively.

When the disc 21 is reversely reproduced, a reverse direction reproduction information retrieval section 22 retrieves information stored in the tables C and D. The information recorded on the disc 21 is searched and reproduced in order in the reverse direction.

Figure 2:
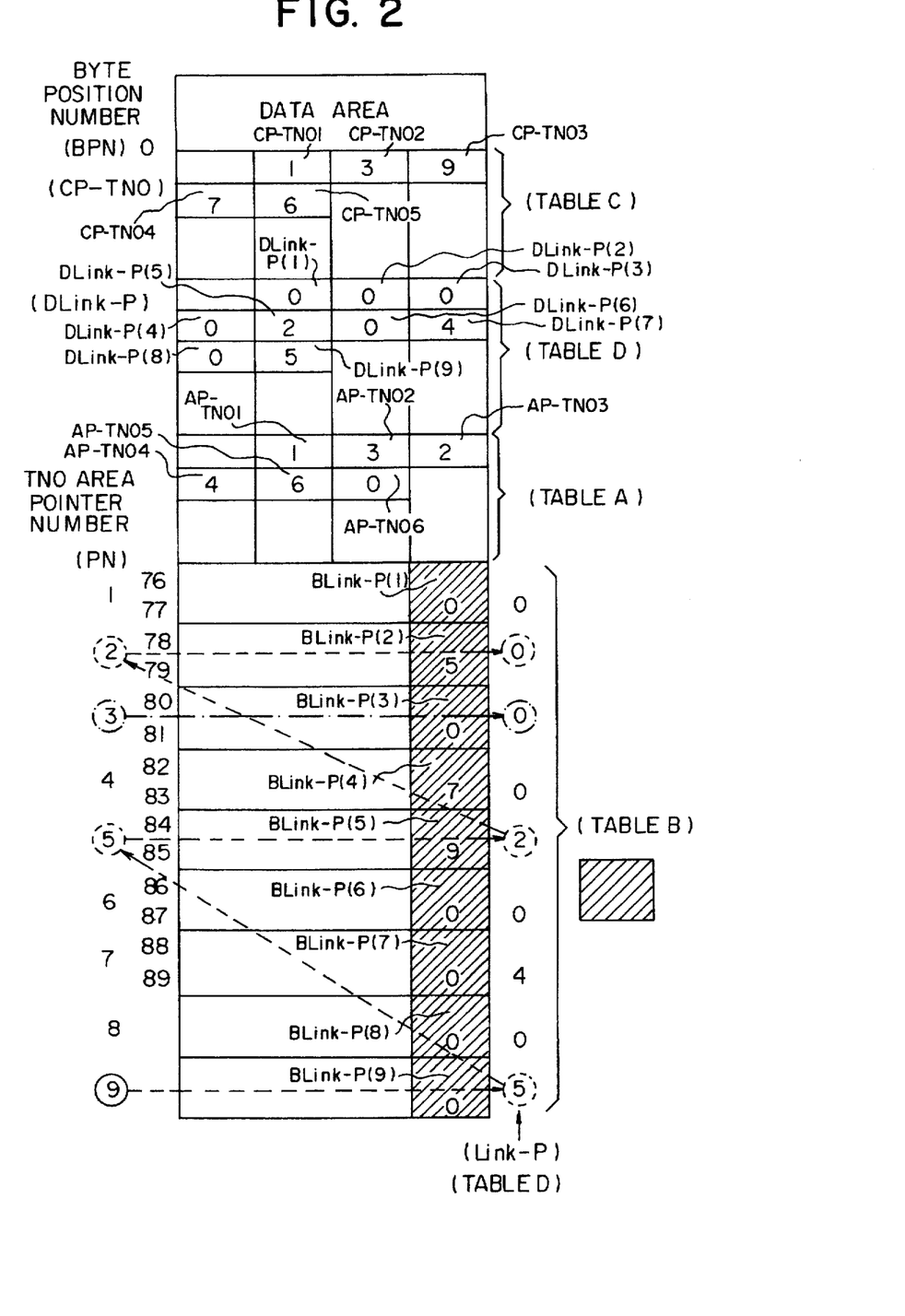
FIG. 2 is a diagram showing tables stored in the system according to the invention.

FIG. 2 shows data stored in the tables A, B, C and D.

The table A stores the pointer number PN of the track number P-TNO indicated by AP-TNO for representing the start address of the first information part of the music reproduced.

The table B stores the linking pointer indicated by BLink-P for representing the next information part to be reproduced next to the information part of the music. The PN 0 of the BLink-Pn represents that there is no part to be reproduced next.

The table C stores the PN of the track number indicated by CP-TNO for representing the end address of the last information part of the music.

The table D stores the linking pointer indicated by DLink-P for representing the information part prior to the information part of the music. That is to say, it is the part to be reproduced next to the part reproduced at present in the reverse direction.

Figure 3:
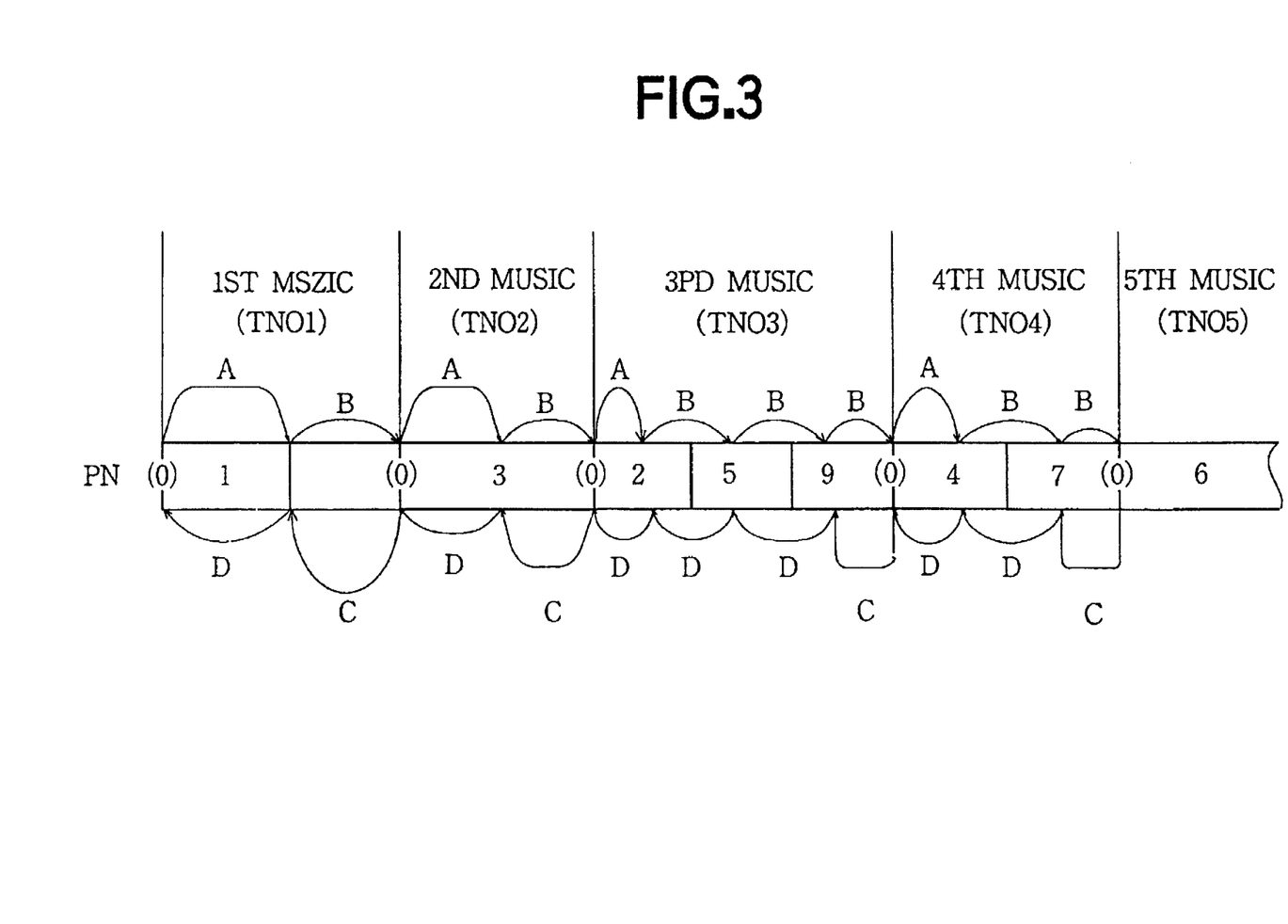
FIG. 3 is a diagram showing data recorded on the MD indicated by tables according to the invention.

FIG. 3 shows an example of five musics recorded on the disc. The musics are reproduced in order in the forward direction. Each music has the pointer numbers PNs which are stored in the tables A, B, C and D for searching the order of the reproduction.

The first music has the PN 1, the second music has the PN 3, the third music is divided into three parts having PN 2, PN 5 and PN 9, the fourth music is divided into two parts having the PN 4 and PN 7, and the fifth music has the PN 6.

As aforementioned, the table A stores the PN for the start address of the first information part of each music, such as AP-TNO 1=PN 1, AP-TNO 2=PN 3, and AP-TNO 3=PN 2 . . .

To the contrary, the table C stores the end address of the last information of the music, such as CP-TNO 1=PN 1, CP-TNO 2=PN 3, and CP-TNO 3=PN 9 . . .

In the table B, the PN 2, PN 5, PN 9 and PN 0 are stored for the third music. Namely, when the music is divided into a plurality of information parts, the start address for the next part to be reproduced is stored. As aforementioned, when the PN is zero, there is no part to be reproduced next.

To the contrary, in the table D, the PN 9, PN 5, PN 2 and PN 0 are stored for the third music. Namely, in the case of a music having a plurality of information parts, the PN of the pointer of the end address for the prior part is stored.

Figure 4:
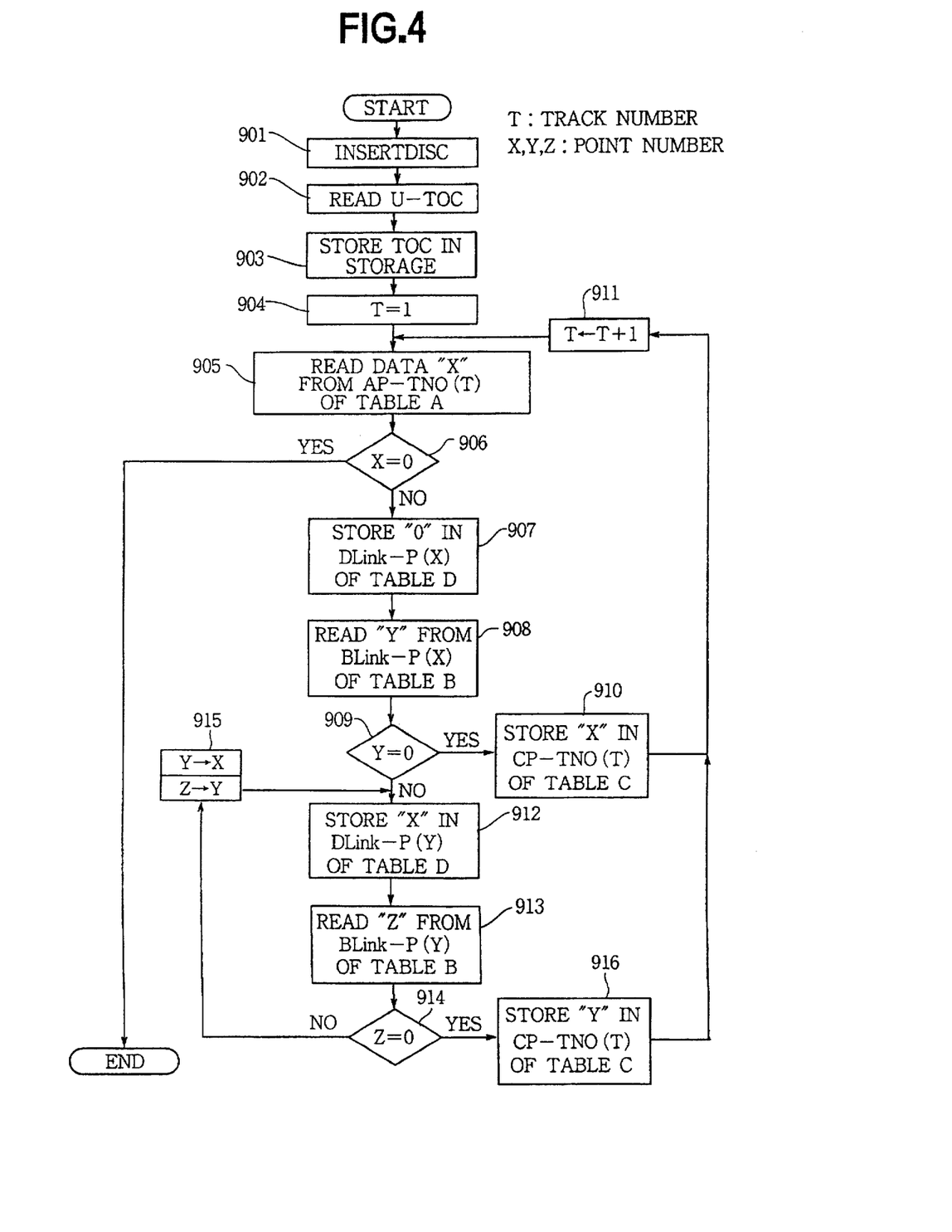
FIG. 4 is a flowchart showing an operation for making tables for a reverse reproduction according to the invention.

The operations for making tables C and D for the reverse reproduction will be described with reference to the flowchart of FIG. 4.

At a step 901, the MD 20 is inserted into the recording and reproducing system 100. At a step 902, the U-TOC as shown in FIG. 9 is read out from the TOC area on the disc 21 by the pickup 4. At a step 903, the read-out U-TOC is stored in the vacant area of the DRAM 12.

At a step 904, the track number (music number) T is set to T=1. At a step 905, the pointer number PN "X" of the AP-TNO(T=1) in the table A is read out from the table A as shown in Pig. 2.

At a step 906, it is determined whether the read-out "X" of the PN is "0" (X=0) or not. Since the PN of the AP-TNO 1 of FIG. 2 is "1", the program goes to a step 907 where "0" (DLink-P(1) of FIG. 2) is stored in the table D at the DLink-P(X=1) for the reverse reproduction. The fact that the PN=0 in the table D for the first music means that the part of the PN 1 becomes the last part of the first music in the reverse reproduction.

At a step 908, the PN "Y" of the BLink-P(X=1) in the table B is read out. At a step 909, it is determined whether the read-out "Y" is "0" (Y=0) or not. Since the PN of the BLink-P 1 is "0" as shown in FIG. 2, the program goes to a step 910 where the PN "X=1" is stored in the CP-TNO (T=1) of the table C. Thus, the making of the table of the track number T1 is completed.

At a step 911, 1 is added to the track number T1 to make the tables of the track number T2 (second music) in the same manner as the aforementioned.

Namely, since the pointer number PN "X" of the AP-TNO (T=2) in the table A is read out as "3" at the step 905, "0" (DLink-P(2) of FIG. 2) is stored in the table D at the DLink-P(X=3). The PN "X=3" is stored in the CP-TNO(T=2) of the table C.

Describing for making tables of the track number T3, 1 is added to the track number T2 (step 911). At the step 905, the PN "X" of the AP-TNO(T=3) in the table A is read out as "2" as shown in FIG. 2. At the step 906, X≠0 is determined. Thus, at the step 907, "0" is stored in the table D at the DLink-P(X=2). At the step 908, the PN "Y" of the BLink-P(X=2) in the table B is read out as "5". At the step 909, Y≠0 is determined.

The program goes to a step 912 where X=2 is stored in the table D at the DLink-P(Y=5). At a step 913, the PN "Z" of the BLink-P(Y=5) in the table B is read out as "9" as shown in FIG. 2. At a step 914, since Z≠0 is determined, the program goes to a step 915 where the Y is regarded as the X (Y→X) and the Z is regarded as the Y (Z→Y). Thus, the X is 5 and the Y is 9.

At the step 912, X=5 is stored in the DLink-P(Y=9). At the step 913, the PN "Z" of the BLink-P(Y=9) in the table B is read out as "0". At the step 914, the Z=0 is determined, and the program goes to a step 916 where the PN "Y=9" is stored in the CP-TNO(T=3) of the table C. Thus, the tables of the track number T3 are made. The program returns to the step 911.

The tables of the track numbers T4 and T5 are made in the same manners.

In the track number T6, the PN "X" of the AP-TNO(T=6) is "0" as shown in FIG. 2. It means that there is no information for the track number T6 so that the program is terminated.

The reverse direction reproduction will be described in accordance with the tables C and D.

For example, if a reverse button (not shown) is pushed while the last (third) information part of the third music is forwardly reproduced, the third part is reversely reproduced. When the reverse reproduction reaches the start position of the third information part, the information part (second part) prior to the third part is searched. In the table C, the PN of the CP-TNO 3 is "9". Therefore, in accordance with the PN 9, the PN of the DLink-P(9) in the table D is read out. The PN of the DLink+P(9) is "5". Thus, the end address of the PN 5 is read out so that the prior part is reversely reproduced.

Thereafter, the information part (first part) prior to the second part corresponding to the PN 5 is searched in the table D. The PN of the DLink-P(5) is read out as "2" so that the end address of the PN 2 is read out. Thus, the first part is reversely reproduced. Then, the PN of the DLink-P(2) is read out in the table D. Since the PN is "0", it is determined that there is no part to be reversely reproduced in the third music.

Next, the second music prior to the third music is reversely reproduced. The last part of the second music is searched in the table C. The PN of the CP-TNO 2 is read out as "3". The end address of the PN 3 is read out to be reversely reproduced.

Then, the PN of the DLink-P(3) is read out in the table D as "0". It is determined that there is no part to be reversely reproduced in the second music. In other word, the second music is formed by the sole part of the PN 3.

The first music prior to the second music is reversely reproduced in the same manner. The last part of the first music is searched in the table C. The PN of the CP-TNO 1 is read out as "1". The end address of the PN 1 is read out to be reversely reproduced. Thereafter, the PN of the DLink-P(1) is read out in the table D as "0". Since there is no part to be reversely reproduced in the first music, the reverse direction reproduction is finished.

In the embodiment, the pointer is formed immediately after the MD 20 is inserted into the system 100. Alternatively, the pointer may be formed in an optional timing during reproducing or recording data for three seconds of the DRAM.

Although the tables are made in the vacant area of the DRAM in the embodiment, another memory may be provided for the tables. Furthermore, the pointer can be recorded on an unrecorded area of the TOC area of the magneto-optical disc.

In accordance with the present invention, the reverse reproduction is performed in accordance with the address information stored in a table for the reverse reproductions. Therefore, in the reverse reproduction, the number of retrieval of the pointer number (address) for recognizing from the last part of the optional music to the first part of the first music is largely reduced. Thus, the search time in the reverse reproduction is reduced, the sound interruption can be prevented, and the software process is simplified.

While the presently preferred embodiments of the present invention has been shown and described, it is to be understood that these disclosures are for the purpose of illustration and that various changes and modifications may be made without departing from the scope of the invention as set forth in the appended claims.

What is claimed is:

1. An information reproducing system for an optical disc on which a plurality of information data are recorded, each of the information data comprising a plurality of information parts, each of the information parts having a pointer number, the system comprising:

a first table storing pointer numbers arranged in a forward reproducing direction for every information part;

a second table storing pointer numbers arranged in a reverse reproducing direction for every information part, the arrangement of the pointer numbers in the second table being performed by reversely arranging the pointer numbers stored in the first table for a corresponding information data; and reproducing means for fast reproducing the information parts in the reverse direction by retrieving the pointer numbers stored in the second table.

2. The system according to claim 1, further comprising a third table storing an end pointer which represents a last part of an information part.

* * * * *